US012325034B2

(12) United States Patent
Min

(10) Patent No.: US 12,325,034 B2
(45) Date of Patent: Jun. 10, 2025

(54) COSMETIC CONTAINER

(71) Applicant: DOOCO CO., LTD., Incheon-si (KR)

(72) Inventor: Byung Sun Min, Bucheon-si (KR)

(73) Assignee: DOOCO CO., LTD., Incheon-si (KR)

( * ) Notice: Subject to any disclaimer, the term of this patent is extended or adjusted under 35 U.S.C. 154(b) by 405 days.

(21) Appl. No.: 18/076,817

(22) Filed: Dec. 7, 2022

(65) Prior Publication Data

US 2023/0113740 A1 Apr. 13, 2023

(30) Foreign Application Priority Data

Dec. 8, 2021 (KR) ........................ 10-2021-0174476

(51) Int. Cl.
*A45D 34/04* (2006.01)
*B05B 11/10* (2023.01)

(52) U.S. Cl.
CPC .... *B05B 11/1001* (2023.01); *A45D 2200/055* (2013.01); *B05B 11/1047* (2023.01)

(58) Field of Classification Search
CPC ............. B05B 11/1001; B05B 11/1047; B05B 11/1059; B05B 11/028; B05B 11/1023; B05B 11/1069; B05B 11/1074; A45D 2200/055; A45D 34/00
See application file for complete search history.

(56) References Cited

U.S. PATENT DOCUMENTS

| | | | | |
|---|---|---|---|---|
| 2015/0108171 | A1* | 4/2015 | Kim | B05B 11/1059 222/321.3 |
| 2016/0331103 | A1* | 11/2016 | Naramoto | A45D 40/065 |
| 2020/0102138 | A1* | 4/2020 | Eng | B05B 11/1081 |
| 2020/0163439 | A1* | 5/2020 | Lee | A45D 40/04 |

FOREIGN PATENT DOCUMENTS

| | | | |
|---|---|---|---|
| KR | 20-0442432 | Y1 | 11/2008 |
| KR | 20-0475334 | Y1 | 12/2014 |
| KR | 20-0493568 | Y1 | 4/2021 |
| KR | 10-2308121 | B1 | 10/2021 |

* cited by examiner

*Primary Examiner* — Donnell A Long
(74) *Attorney, Agent, or Firm* — Hauptman Ham, LLP

(57) ABSTRACT

The present disclosure relates to a cosmetic container wherein a holder side portion has holder engaging protrusions formed on the inner surface thereof so as to face each other, left deformation assistance long holes are formed in straight shapes in left areas of the holder engaging protrusions, respectively, so as to extend from the lower end to positions higher than the holder engaging protrusions, and right deformation assistance long holes are formed in straight shapes in right areas of the holder engaging protrusions in parallel to the left deformation assistance long holes, respectively, so as to extend from the lower end to positions higher than the holder engaging protrusions. Accordingly, the inner container can be replaced easily.

2 Claims, 22 Drawing Sheets

COSMETIC CONTAINER

CROSS-REFERENCE TO RELATED APPLICATION(S)

This application is based upon and claims the benefit of priority from Korean Patent Application No. 10-2021-0174476, filed on Dec. 8, 2021 in the Korean Intellectual Property Office, the entire contents of which is incorporated herein by reference.

BACKGROUND

1. Field

The present disclosure relates to a cosmetic container and, more specifically, to a cosmetic container having a structure in which a cosmetic product stored in an inner container is discharged to the outside through a button pressing manipulation.

2. Description of the Prior Art

There is a cosmetic container having a structure in which a cosmetic product stored in an inner container is used by discharging the same to the outside through button pressing manipulation, and the inner container is replaced with a new one if the cosmetic product is used up.

Referring to FIG. 16 to FIG. 21, a conventional cosmetic container includes: an outer container 110 having a tube-shaped outer container body portion 111 and a concave outer container rotatable cap 120 rotatably coupled to the lower end of the outer container body portion 111; a concave inner container holder 140 installed in the outer container 110; an inner container 130 provided with a tube-shaped inner container body portion 131 and coupled to the inner container holder 140; a cylinder 150 installed in the inner container body portion 131; an inner cap 160 installed between the outer container 110 and the inner container 130; a button 170 installed above the cylinder 150 to be able to descend toward the cylinder 150; and a pumping portion 180 having a container piston 185 installed in the inner container 130.

The outer container body portion 111 has a button rotation prevention groove 111*a* formed on the upper end thereof, and has a pair of straight upward/downward movement guide protrusions 111*b* provided in the lower area of the inner surface thereof so as to face each other.

The outer container body portion 111 has a rotatable coupling groove 111*c* provided on the lower end thereof along the circumferential direction.

The outer container rotatable cap 120 has a tube-shaped rotatable cap side portion 121, a rotatable cap bottom portion 122 extending from the lower end of the rotatable cap side portion 121 and having a pressurization plate 124 provided at the center thereof, and a pressurization column 123 protruding from the upper surface of the pressurization plate 124.

The rotatable cap side portion 121 has a rotatable coupling protrusion 121*e* provided on the inner surface of the upper end thereof so as to face each other.

The rotatable cap bottom portion 122 has a rotatable cap long hole 122*a* provided in an arc shape in order to provide the pressurization plate 124.

The outer container rotatable cap 120 is coupled to the lower end of the outer container body portion 111 such that the rotatable coupling protrusion 121*e* is inserted into the rotatable coupling groove 111*c*. As a result, the outer container rotatable cap 120 can rotate with regard to the outer container body portion 111.

The inner container holder 140 has a tube-shaped holder side portion 141 and a holder bottom portion 142 extending from the lower end of the holder side portion 141.

The holder side portion 141 has holder engaging protrusions 141*c* formed on the inner surface thereof.

The holder side portion 141 has thin areas 141*f* formed in rectangular shapes in areas on the outer surface thereof, which correspond to the holder engaging protrusions 141*c*, respectively.

The holder bottom portion 142 has a column insertion hole 142*a* formed at the center thereof.

The inner container 130 has a concave inner container end cap 134 coupled to the lower end of the inner container body portion 131, in addition to the inner container body portion 131.

The concave inner container end cap 134 has an end cap side portion 134*a*, an end cap bottom portion 134*b* extending from the lower end of the end cap side portion 134*a*, and an end cap engaging ledge 134*c* protruding from the outer surface of the end cap side portion 134*a*.

The end cap bottom portion 134*b* has a ventilation hole 134*d* formed therein.

The inner container end cap 134 is coupled to the lower end of the inner container body portion 131 such that the end cap engaging ledge 134*c* protrudes outwards past the outer surface of the inner container body portion 131.

The inner container 130 is coupled to the inner container holder 140 such that the inner container end cap 134 is disposed in the inner container holder 140, and such that the upper surface of the end cap engaging ledge 134*c* contacts the bottom surface of the holder engaging protrusions 141*c*.

The pumping portion 180 operates such that, when the button 170 descends toward the cylinder 150, the cosmetic product stored in the cylinder 150 is discharged to the outside and, when the button 170 ascends to the original position, the cosmetic product stored in the inner container 130 is introduced into the cylinder 150.

The container piston 185 ascends while the cosmetic product stored in the inner container 130 is introduced into the cylinder 150.

A method for replacing the inner container 130 of the conventional cosmetic container will now be described with reference to FIG. 22.

The pressurization plate 124 is first bent upwards such that the pressurization column 123 pressurizes the end cap bottom portion 134*b*. The end cap engaging ledge 134*c* then moves upwards past the holder engaging protrusions 141*c*, thereby separating the inner container 130 from the inner container holder 140. The inner container 130 is separated together with remaining components (button, cylinder, and the like) other than the outer container 110 and the inner container holder 140. For convenience of description, the assembly of the inner container 130 and the components separated together with the inner container 130 will hereinafter referred to as a refill assembly.

Next, the refill assembly including a new inner container storing a cosmetic product is pressurized toward the holder bottom portion 142. The end cap engaging ledge 134*c* then moves downwards past the holder engaging protrusions 141*c*, thereby coupling the inner container 130 to the inner container holder 140.

However, in the case of the cosmetic container, the larger force is applied to the pressurization plate 124 or the refill assembly, the more difficult it becomes to replace the inner container 130. Therefore, there is a need to reduce the force applied to the pressurization plate 124 or the refill assembly.

If the degree of protrusion of the holder engaging protrusions 141*c* is reduced to reduce the force applied to the pressurization plate or the refill assembly, another problem occurs in that it is difficult to keep the inner container 130 stably coupled to the inner container holder 140.

SUMMARY OF THE INVENTION

Therefore, it is an aspect of the present disclosure to provide a cosmetic container configured such that, when the inner container is replaced, the force applied to the pressurization plate or the refill assembly can be reduced.

An aspect of the present disclosure provides a cosmetic container wherein a holder side portion has holder engaging protrusions formed on the inner surface thereof so as to face each other; left deformation assistance long holes are formed in straight shapes in left areas of the holder engaging protrusions, respectively, so as to extend from the lower end of the holder side portion to positions higher than the holder engaging protrusions; right deformation assistance long holes are formed in straight shapes in right areas of the holder engaging protrusions in parallel to the left deformation assistance long holes, respectively, so as to extend from the lower end of the holder side portion to positions higher than the holder engaging protrusions; an inner container is coupled to an inner container holder such that the upper surface of an end cap engaging ledge contacts the bottom surface of the holder engaging protrusions; and when a pressurization plate is bent upwards such that a pressurization column pressurizes an end cap bottom portion, the end cap engaging ledge moves upwards past the holder engaging protrusions, thereby separating the inner container form the inner container holder.

The holder side portion is preferably formed such that inter-long hole areas (areas between the left deformation assistance long holes and the right deformation assistance long holes among the entire area of the holder side portion) are thinner than holder side remaining areas (remaining areas other than the inter-long hole areas among the entire area of the holder side portion).

The present disclosure is advantageous in that the holder side portion has a left deformation assistance long hole and a right deformation assistance long hole formed therein such that the volume of (the size of space occupied by) the holder side portion in the left and right areas of the holder engaging protrusion is reduced, thereby reducing the force applied to the pressurization plate or the refill assembly when the inner container is replaced.

In addition, the inter-long hole area is formed thinner than the holder side remaining area such that the volume of the holder side portion is reduced in the lower area of the holder engaging protrusion, thereby further reducing the force applied to the pressurization plate or the refill assembly when the inner container is replaced.

By reducing the force applied to the pressurization plate or the refill assembly, the inner container can be replaced easily.

If the inner container can be replaced easily, it is unnecessary to reduce the degree of protrusion of the holder engaging protrusion to reduce the force applied to the pressurization plate or the refill assembly, and the inner container can thus remain stably coupled to the inner container holder.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
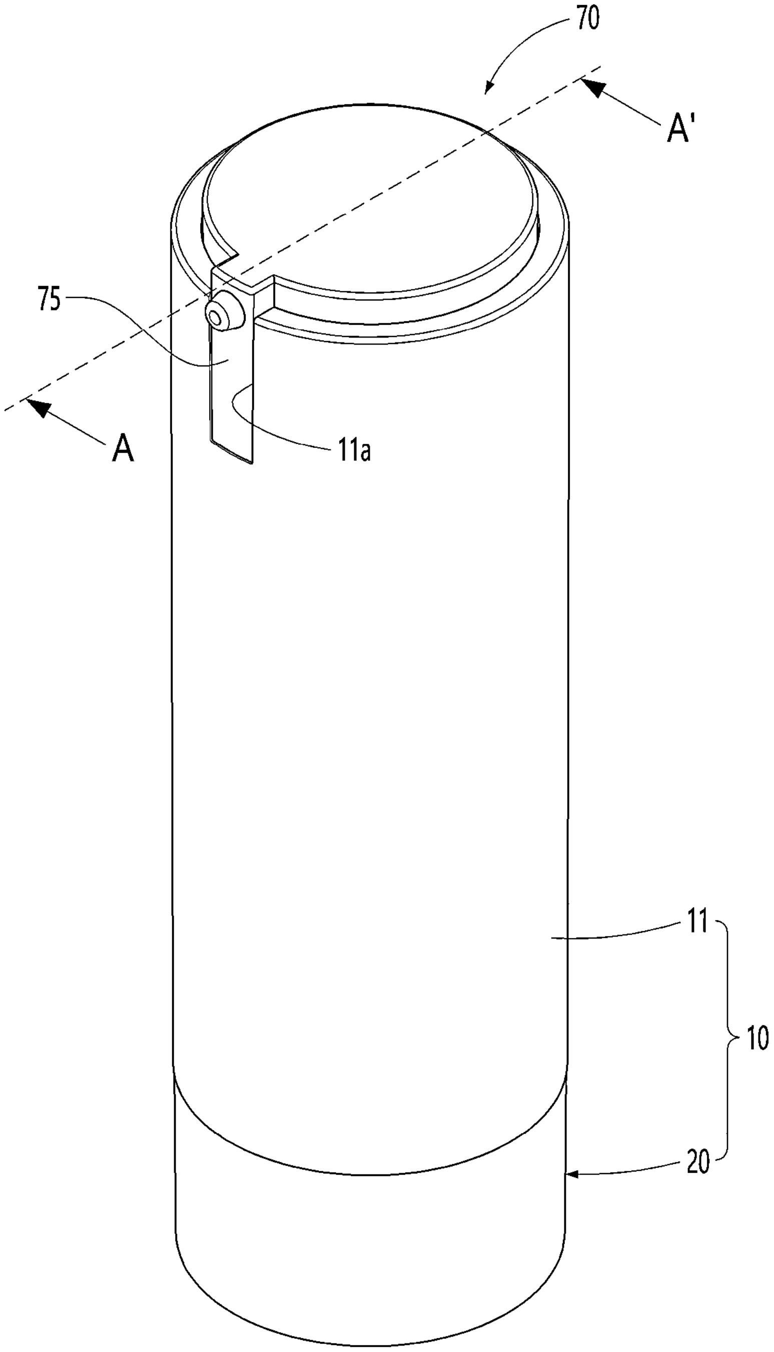
FIG. 1 is an assembled perspective view of a cosmetic container according to an embodiment of the present disclosure.
Figure 2:
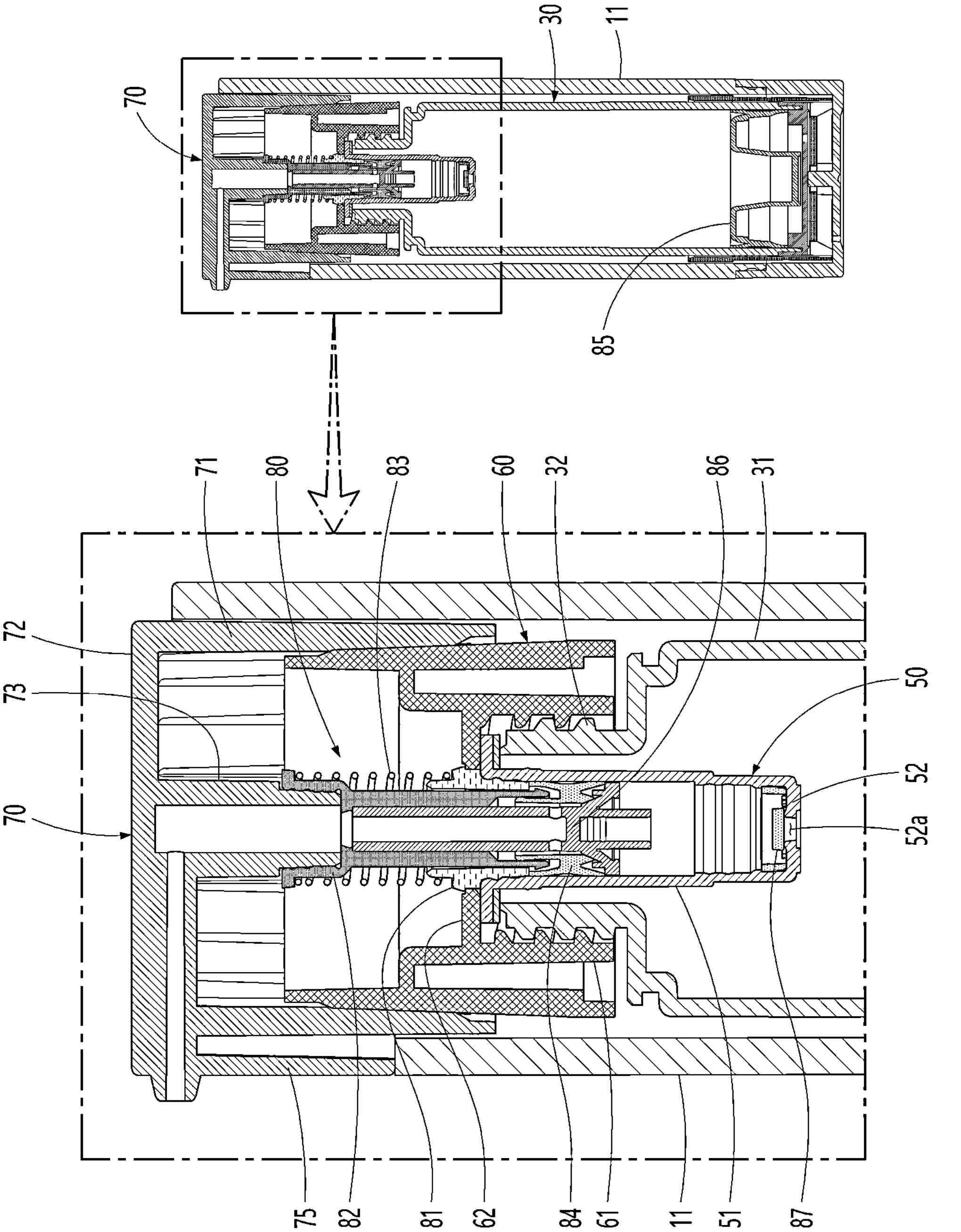
FIG. 2, FIG. 3, and FIG. 4 are sectional views taken along line A-A' in FIG. 1, respectively.
Figure 3:
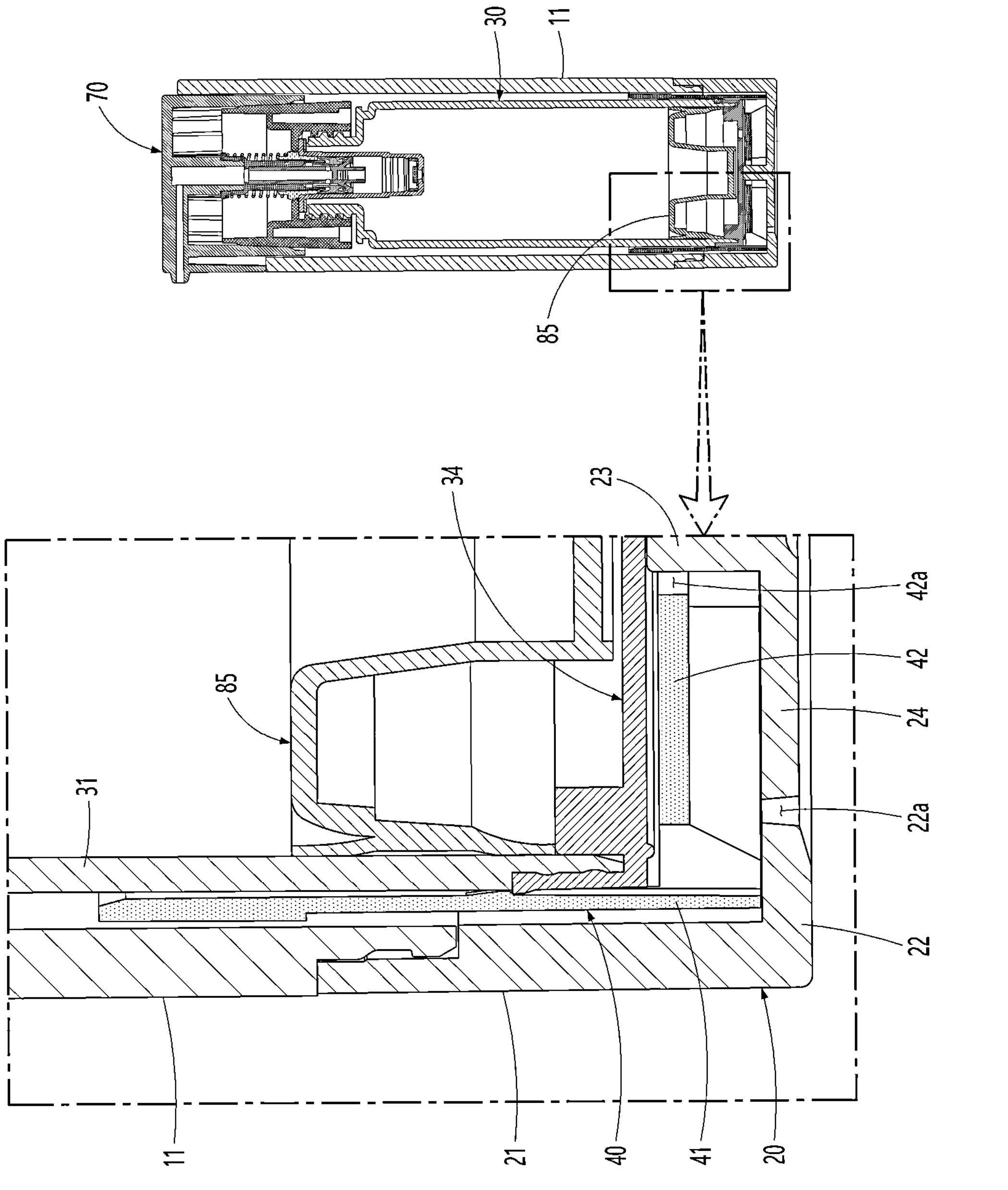
Figure 4:
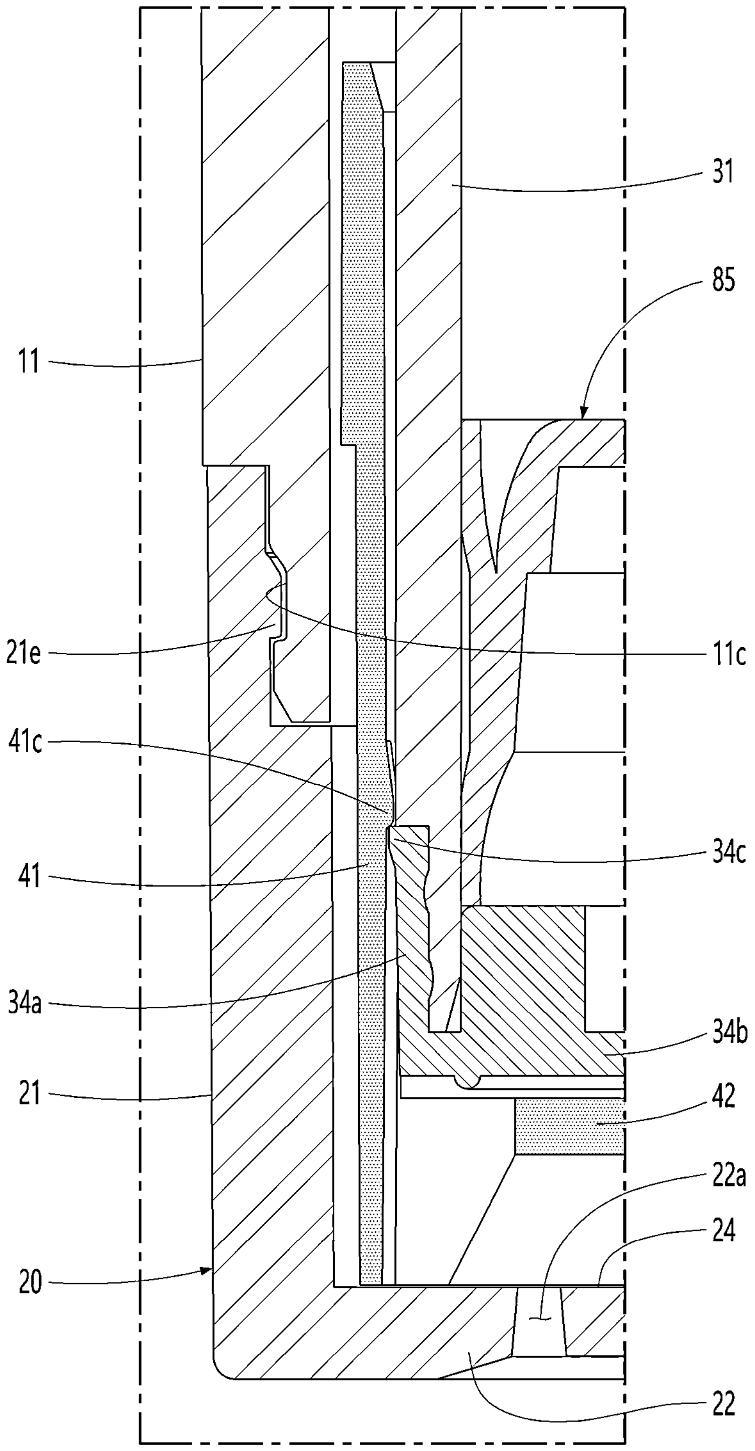
Figure 5:
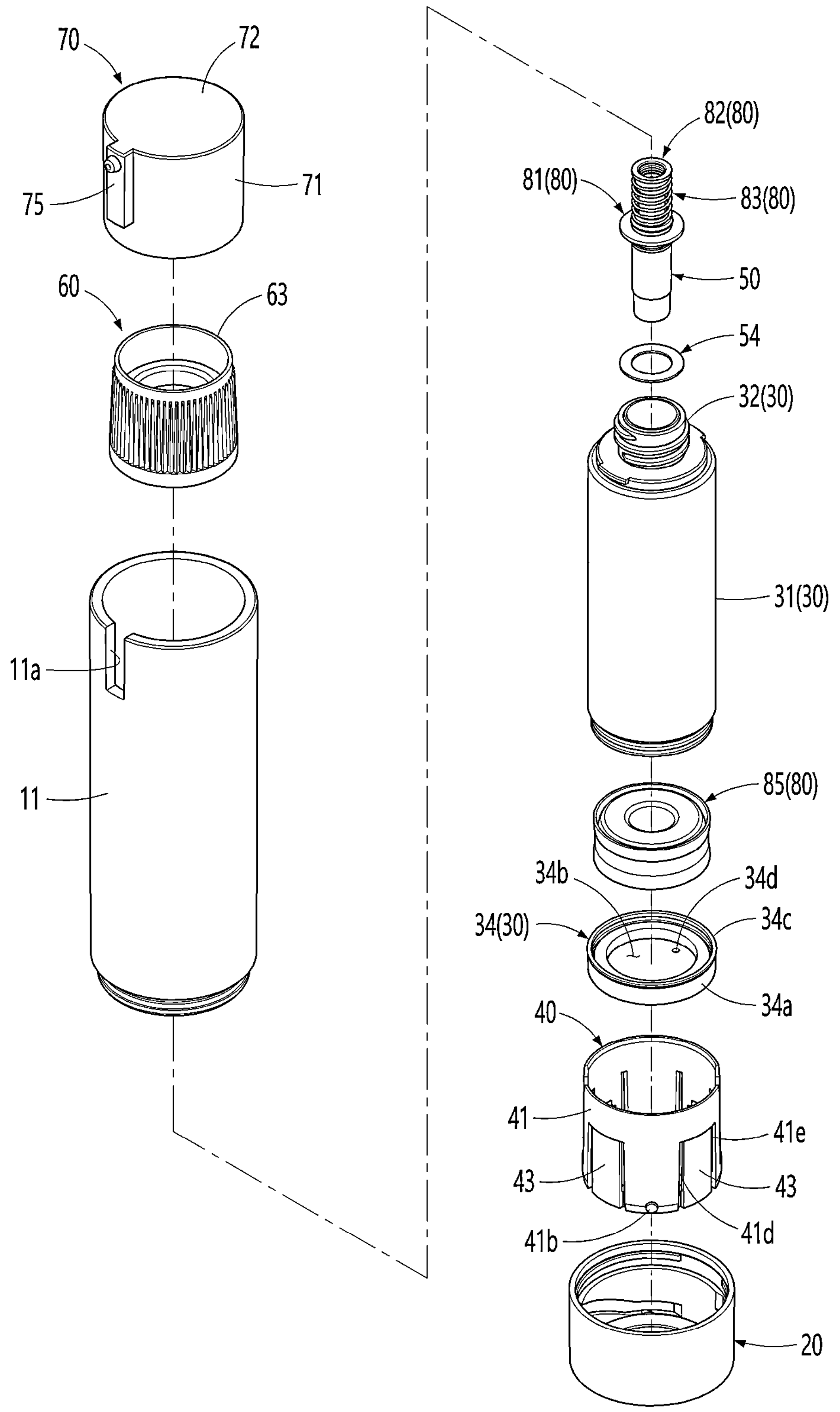
FIG. 5 is an exploded perspective view of a cosmetic container according to an embodiment of the present disclosure.
Figure 6:
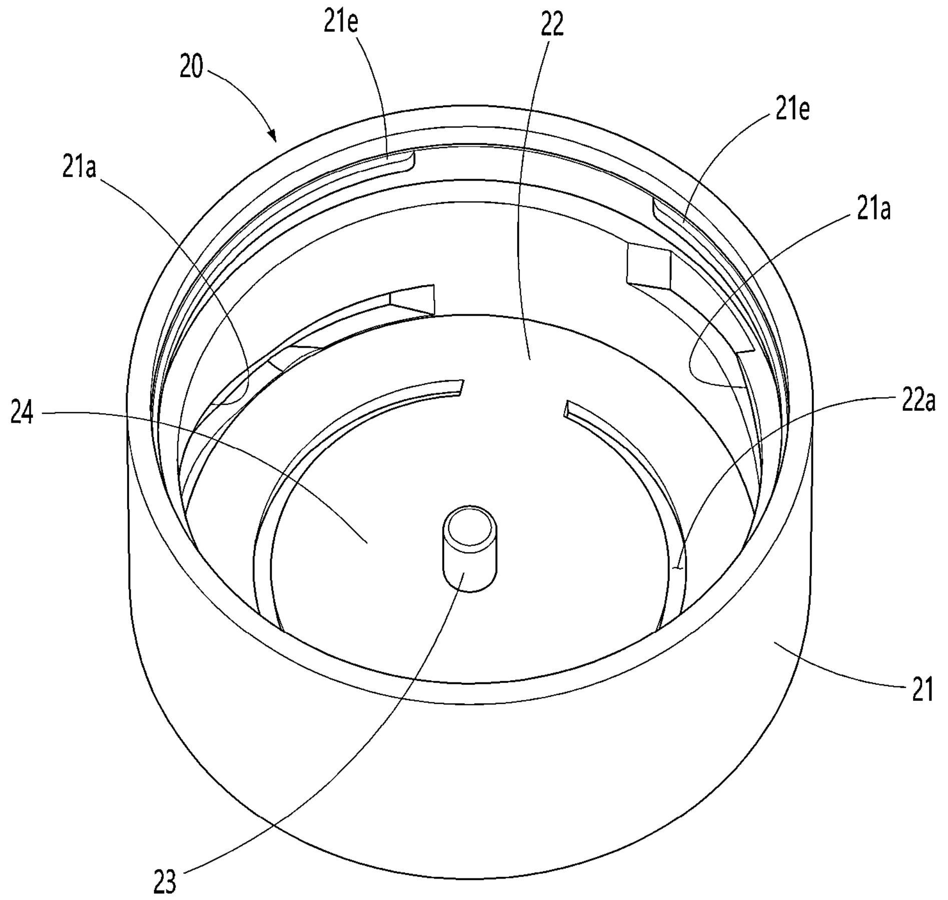
FIG. 6 illustrates an outer container rotatable cap according to an embodiment of the present disclosure.
Figure 7:
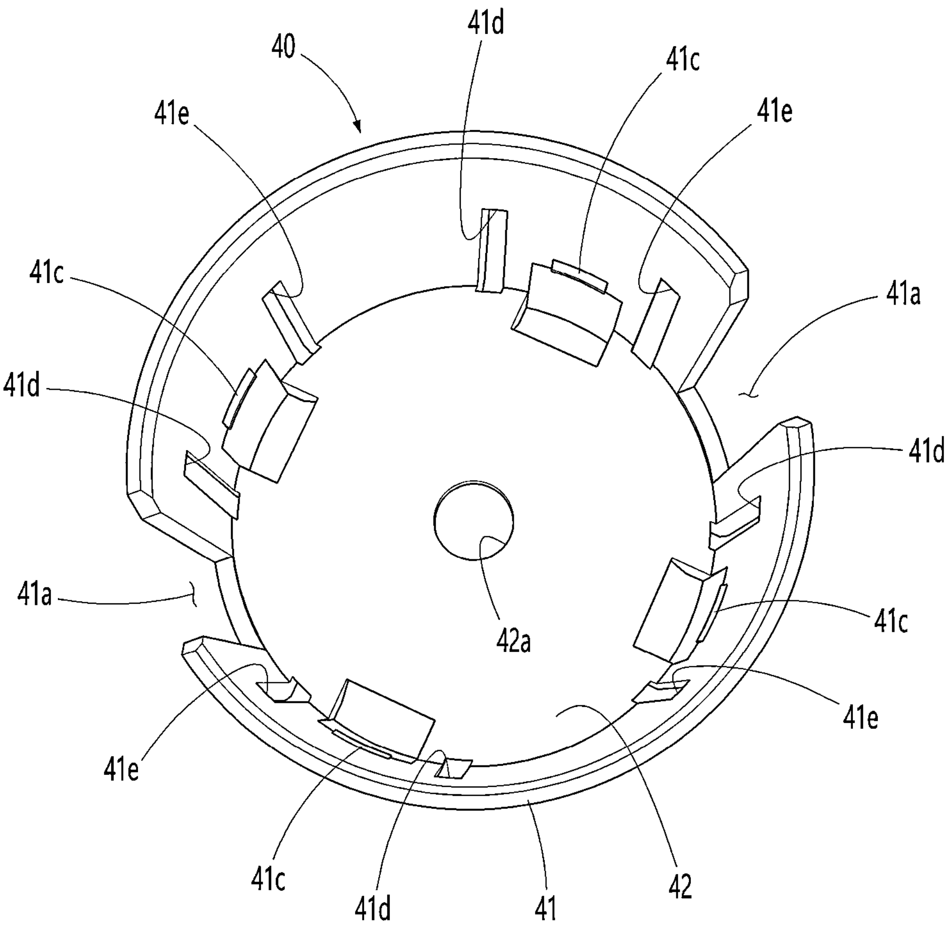
FIG. 7 and FIG. 8 illustrate an inner container holder according to an embodiment of the present disclosure, respectively.
Figure 8:
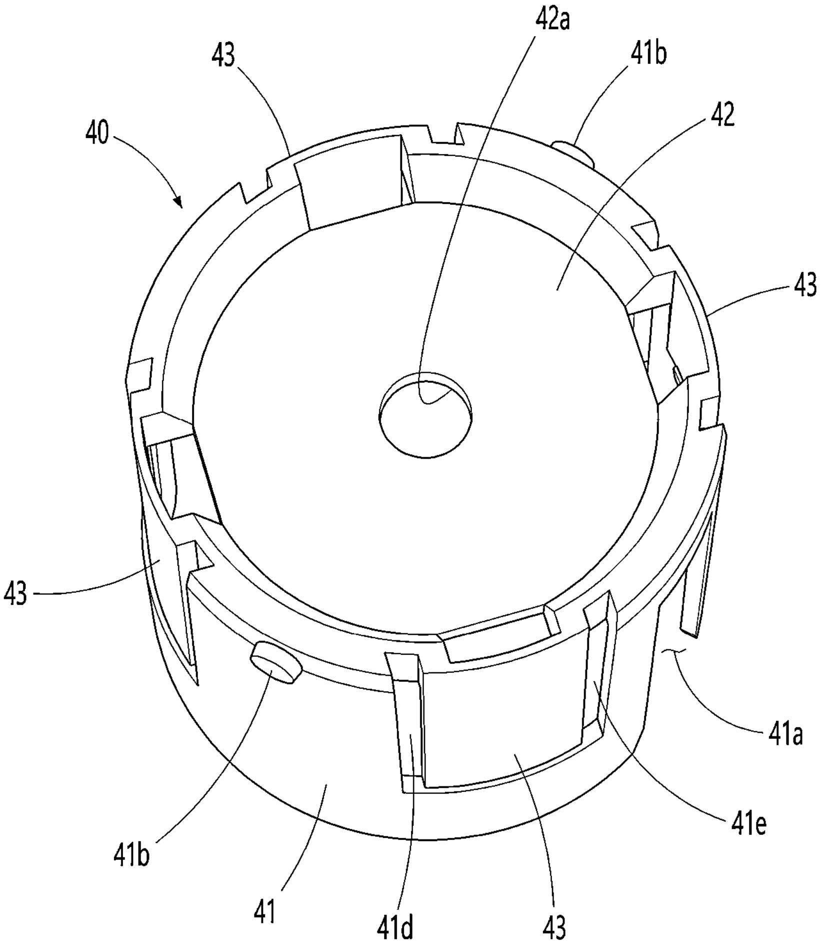
Figure 9:
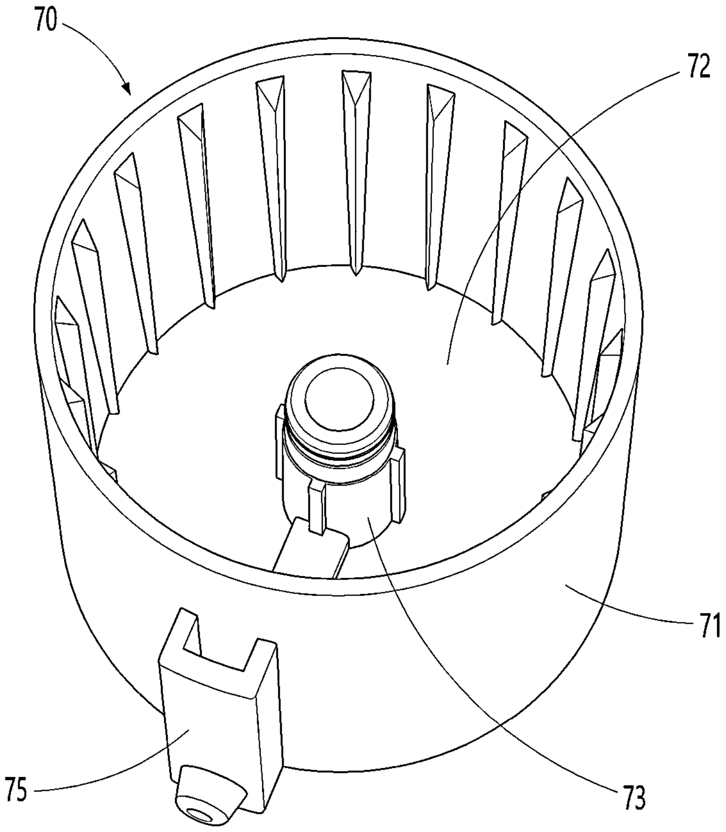
FIG. 9 illustrates a button according to an embodiment of the present disclosure.
Figure 10:
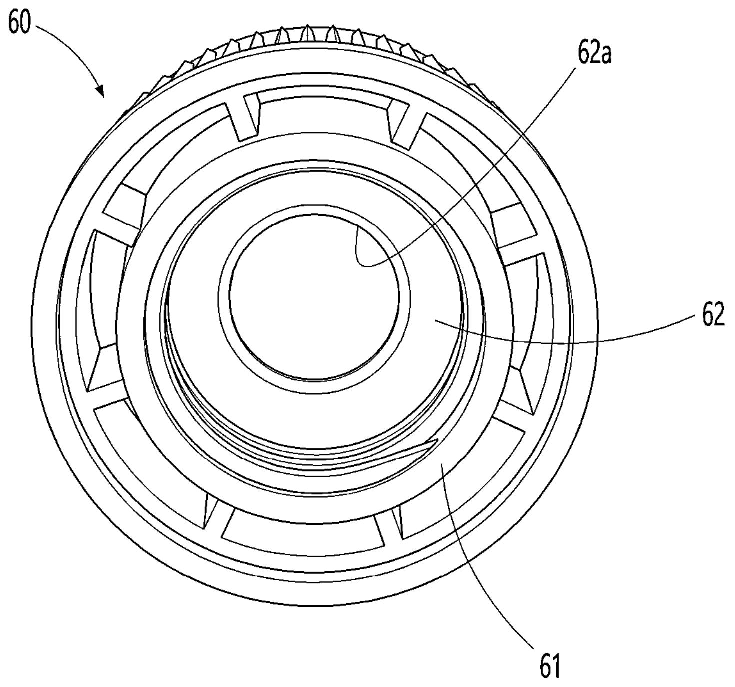
FIG. 10 illustrates an inner cap according to an embodiment of the present disclosure.
Figure 11:
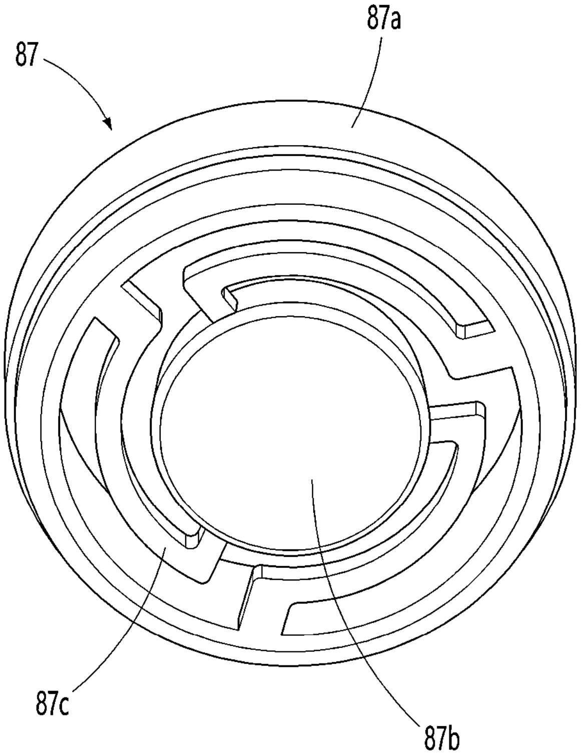
FIG. 11 illustrates a cylinder valve according to an embodiment of the present disclosure.

Hereinafter, the present disclosure will be described in detail with reference to the accompanying drawings.

A cosmetic container according to an embodiment of the present disclosure includes: an outer container 10 having a tube-shaped outer container body portion 11 and a concave outer container rotatable cap 20 rotatably coupled to the lower end of the outer container body portion 11; a concave inner container holder 40 installed in the outer container 10; an inner container 30 provided with a tube-shaped inner container body portion 31 and coupled to the inner container holder 40; a cylinder 50 installed in the inner container body portion 31; an inner cap 60 installed between the outer container 10 and the inner container 30; a button 70 installed above the cylinder 50 to be able to descend toward the cylinder 50; and a pumping portion 80 configured to operate such that, when the button 70 descends toward the cylinder 50, the cosmetic product stored in the cylinder 50 is discharged to the outside and, when the button 70 ascends to the original position, the cosmetic product stored in the inner container 30 is introduced into the cylinder 50.

The outer container body portion 11 has a button rotation prevention groove 11*a* formed on the upper end thereof, and has a pair of straight upward/downward movement guide protrusions 11*b* provided in the lower area of the inner surface thereof so as to face each other.

The outer container body portion 11 has rotatable coupling grooves 11*c* provided on the lower end thereof along the circumferential direction.

The outer container rotatable cap 20 has a tube-shaped rotatable cap side portion 21, a rotatable cap bottom portion 22 extending from the lower end of the rotatable cap side portion 21 and having a pressurization plate 24 provided at the center thereof, and a pressurization column 23 protruding from the upper surface of the pressurization plate 24.

The rotatable cap side portion 21 has a pair of rotatable upward/downward movement guide grooves 21*a* formed on the inner surface thereof so as to face each other.

Each rotatable upward/downward movement guide grooves 21*a* has an upward movement maintenance groove section 21*b*, a downward movement maintenance groove section 21*c* disposed in a position lower the upward movement maintenance groove section 21*b*, and an upward/downward movement guide groove section 21*d* connecting the upward movement maintenance groove section 21*b* and the downward movement maintenance groove section 21*c*.

The rotatable cap side portion 21 has a pair of rotatable coupling protrusions 21*e* provided on the inner surface of the upper end thereof so as to face each other.

The rotatable cap bottom portion 22 has a rotatable cap long hole 22*a* provided in an arc shape in order to provide the pressurization plate 24.

The outer container rotatable cap 20 is coupled to the lower end of the outer container body portion 11 such that the rotatable coupling protrusions 21*e* are inserted into the rotatable coupling grooves 11*c*. As a result, the outer container rotatable cap 20 can rotate with regard to the outer container body portion 11.

The inner container holder 40 has a tube-shaped holder side portion 41 and a holder bottom portion 42 extending from the lower end of the holder side portion 41.

The holder side portion 41 has a pair of straight upward/downward movement guide grooves 41*a* formed on the upper end thereof, has a pair of upward/downward movement guide protrusions 41*b* formed on the outer surface thereof so as to face each other, and has two pairs of holder engaging protrusions 41*c* formed on the inner surface thereof.

The holder side portion 41 has left deformation assistance long holes 41*d* formed in straight shapes in left areas of respective holder engaging protrusions 41*c* so as to extend from the lower end thereof to positions higher than the holder engaging protrusions 41*c*, and has right deformation assistance long holes 41*e* formed in straight shapes in right areas of respective holder engaging protrusions 41*c* in parallel to the left deformation assistance long holes 41*d* so as to extend from the lower end thereof to positions higher than the holder engaging protrusions 41*c*. Among the entire area of the holder side portion 41, the areas between the left deformation assistance long holes 41*d* and the right deformation assistance long holes 41*e* will hereinafter be referred to as inter-long hole areas 43, and the remaining areas other than the inter-long hole areas will be referred to as holder side remaining areas, for convenience of description.

The inter-long hole areas 43 are formed thinner than the holder side remaining areas.

The holder bottom portion 42 has a column insertion hole 42*a* formed at the center thereof.

Figure 12:
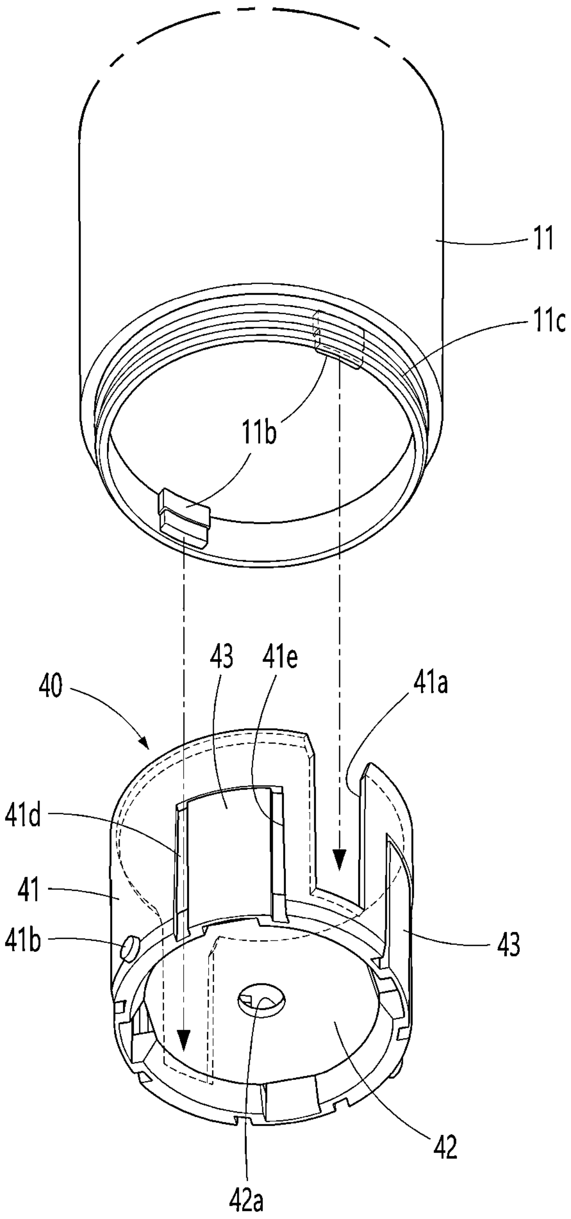
FIG. 12 illustrates a method for installing an inner container holder according to an embodiment of the present disclosure.

The inner container holder 40 is installed such that the straight upward/downward movement guide protrusions 11*b* are inserted into the straight upward/downward movement guide grooves 41*a* (see FIG. 12), and such that the upward/downward movement guide protrusions 41*b* are inserted into the downward movement maintenance groove sections 21*c*. Accordingly, the inner container holder 40 moves upwards/downwards when the outer container rotatable cap 20 is rotated.

The inner container holder 40 is installed such that the end of the pressurization column 23 is inserted into a column insertion hole 42*a*.

The inner container 30 has a tube-shaped inner container neck portion 32 disposed above the inner container body portion 31 and a concave inner container end cap 34 coupled to the lower end of the inner container body portion 31, in addition to the inner container body portion 31.

The inner container end cap 34 has a tube-shaped end cap side portion 34*a*, an end cap bottom portion 34*b* extending from the lower end of the end cap side portion 34*a*, and an end cap engaging ledge 34*c* protruding from the outer surface of the end cap side portion 34*a*.

The end cap bottom portion 34*b* has a ventilation hole 34*d* formed therein.

The end cap engaging ledge 34*c* is formed along the circumferential direction of the end cap side portion 34*a*.

The inner container end cap 34 is coupled to the lower end of the inner container body portion 31 such that the end cap engaging ledge 34*c* protrudes outwards past the outer surface of the inner container body portion 31.

The inner container 30 is coupled to the inner container holder 40 such that the inner container end cap 34 is disposed in the inner container holder 40, and such that the upper surface of the end cap engaging ledge 34*c* contacts the bottom surface of the holder engaging protrusions 41*c*.

When the pressurization plate 24 is bent upwards such that the pressurization column 23 pressurizes the end cap bottom portion 34*b*, the end cap engaging ledge 34*c* moves upwards past the holder engaging protrusions 41*c*, thereby separating the inner container 30 from the inner container holder 40.

The cylinder 50 has a tube-shaped cylinder side portion 51 and a cylinder bottom portion 52 extending from the lower end of the cylinder side portion 51.

The cylinder bottom portion 52 has an inlet hole 52*a* formed at the center thereof.

The cylinder 50 is installed such that the cylinder bottom portion 52 is inserted into the inner container body portion 31. A sealing ring 54 is installed between the cylinder flange 53 and the inner container neck portion 32.

The inner cap 60 has a tube-shaped inner cap side portion 61 and an inner cap ceiling portion 62 extending from the upper end of the inner cap side portion 61.

The inner cap ceiling portion 62 has a communication hole 62*a* formed at the center thereof.

The inner cap 60 is coupled to the inner container neck portion 32 through the inner cap side portion 61.

The button 70 has a tube-shaped button side portion 71, a button ceiling portion 72 extending from the upper end of the button side portion 71, a button discharge channel portion 73 formed in the button ceiling portion 72, and a button rotation prevention protrusion 75 formed to protrude from the outer surface of the button side portion 71.

The button 70 is installed above the cylinder 50 such that the button rotation prevention protrusion 75 is inserted into the button rotation prevention groove 11*a*.

The pumping portion 80 has a spring support member 81 installed above the cylinder 50, a pressurization member 82 and a button return spring 83 installed between the cylinder 50 and the button 70, and cylinder piston 84 installed in the cylinder 50, a container piston 85 installed in the inner container 30, a middle channel member 86 installed between the cylinder 50 and the pressurization member 82, and a cylinder valve 87 installed in the cylinder 50.

The pressurization member 82 is installed such that the upper end thereof is connected to the button discharge channel portion 73, and such that the lower end thereof is inserted into the cylinder 50.

The button return spring 83 is installed such that both ends thereof are supported by the pressurization member 82 and the spring support member 81.

The cylinder piston 84 is installed to be spaced apart from the lower end of the pressurization member 82 and to be forced against the inner surface of the cylinder side portion 51.

The container piston 85 is installed to be forced against the inner surface of the inner container body portion 31.

The middle channel member 86 is installed to contact the lower end of the cylinder piston 84.

The cylinder valve 87 has a tube-shaped valve retaining portion 87*a*, an opening/closing plate 87*b* disposed in the valve retaining portion 87*a*, and a support arm 87*c* connecting between the opening/closing plate 87*b* and the valve retaining portion 87*a*.

The cylinder valve 87 is installed in the cylinder 50 such that the valve retaining portion 87*a* is forced against the inner surface of the cylinder side portion 51, and such that the opening/closing plate 87*b* seals the inlet hole 52*a*.

A method for discharging the cosmetic product from the cosmetic container to the outside according to an embodiment of the present disclosure will now be described with reference to FIG. 13 and FIG. 14.

Figure 13:
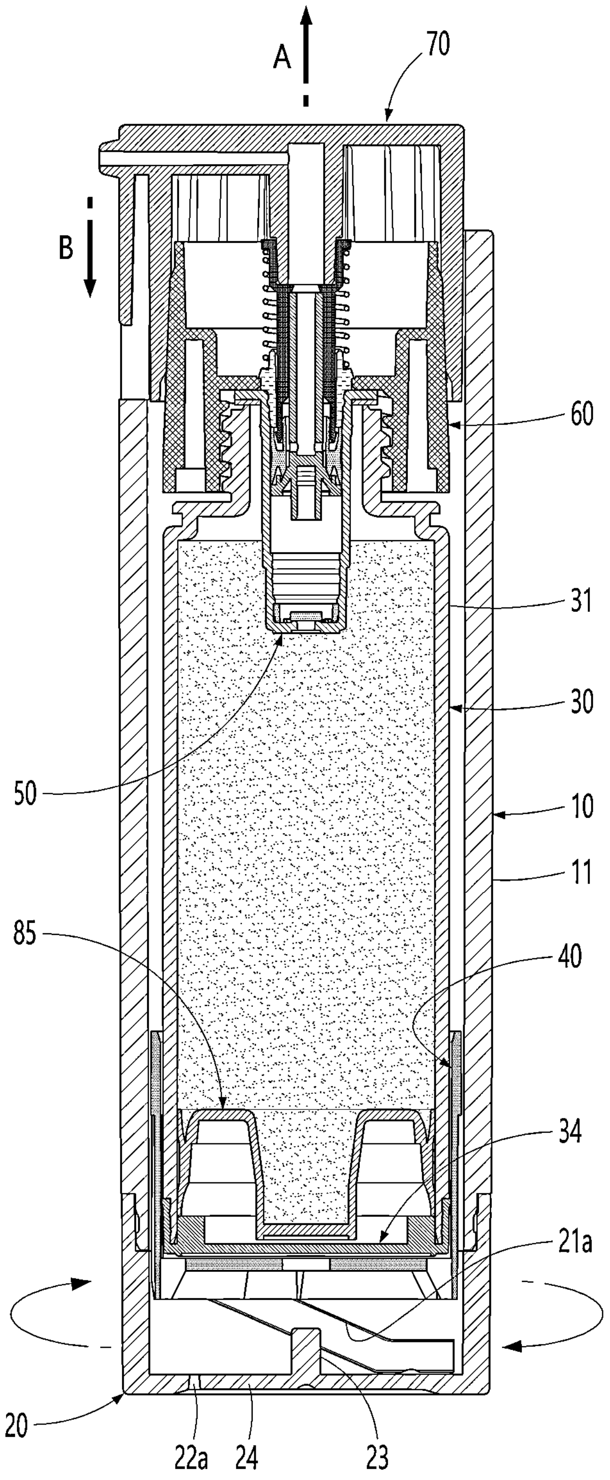
FIG. 13, FIG. 14, and FIG. 15 illustrate a method for using a cosmetic container according to an embodiment of the present disclosure, respectively.
Figure 14:
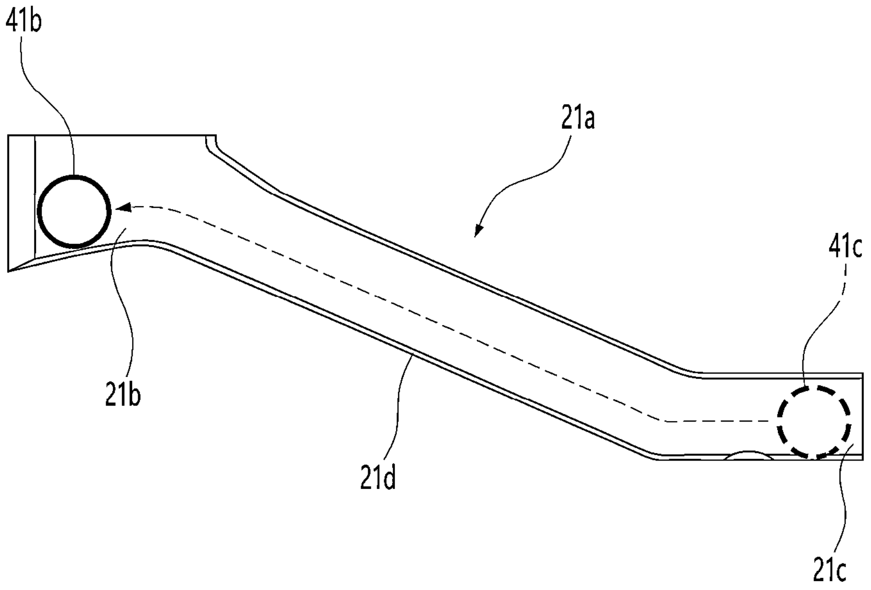

The outer container rotatable cap 20 is rotated such that the upward/downward movement guide protrusions 41*b* reach the upward movement maintenance groove sections 21*b* through the upward/downward movement guide groove sections 21*d*, thereby lifting the inner container holder 40 (see arrow A in FIG. 13 and FIG. 14).

The button 70 is moved downwards by pressing the same downward, thereby moving the cylinder piston 60 downwards (see arrow B in FIG. 13).

The downward movement of the cylinder piston 60 generates a positive pressure state in the cylinder 50 such that the cosmetic product stored in the cylinder 50 is discharged to the outside through the button discharge channel portion 73. The positive pressure state refers to a state in which the pressure is higher than the atmospheric pressure.

If the button 70 is no longer pressed, the button 70 and the cylinder piston 60 are moved upwards by the elastic force accumulated in the button return spring 83.

The upward movement of the cylinder piston 60 generates a negative pressure state in the cylinder 50 such that the cosmetic product stored in the inner container 30 is introduced into the cylinder 50 through the inlet hole 52*a*. The negative pressure state refers to a state in which the pressure is lower than the atmospheric pressure.

When the makeup is over, the outer container rotatable cap 20 is rotated in the opposite direction such that the upward/downward movement guide protrusions 41*b* reach the downward movement maintenance groove sections 21*c* through the upward/downward movement guide groove sections 21*d*, thereby lowering the inner container holder 40 to the original position.

Figure 15:
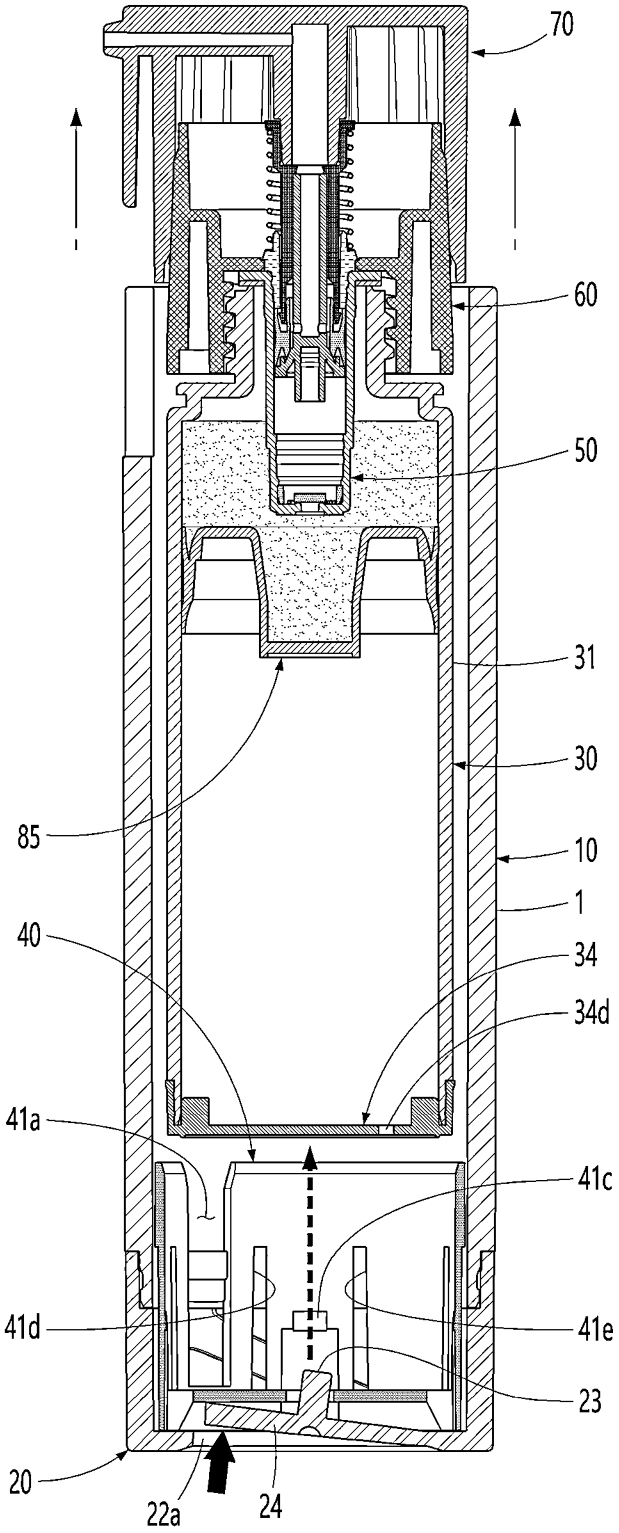
Figure 16:
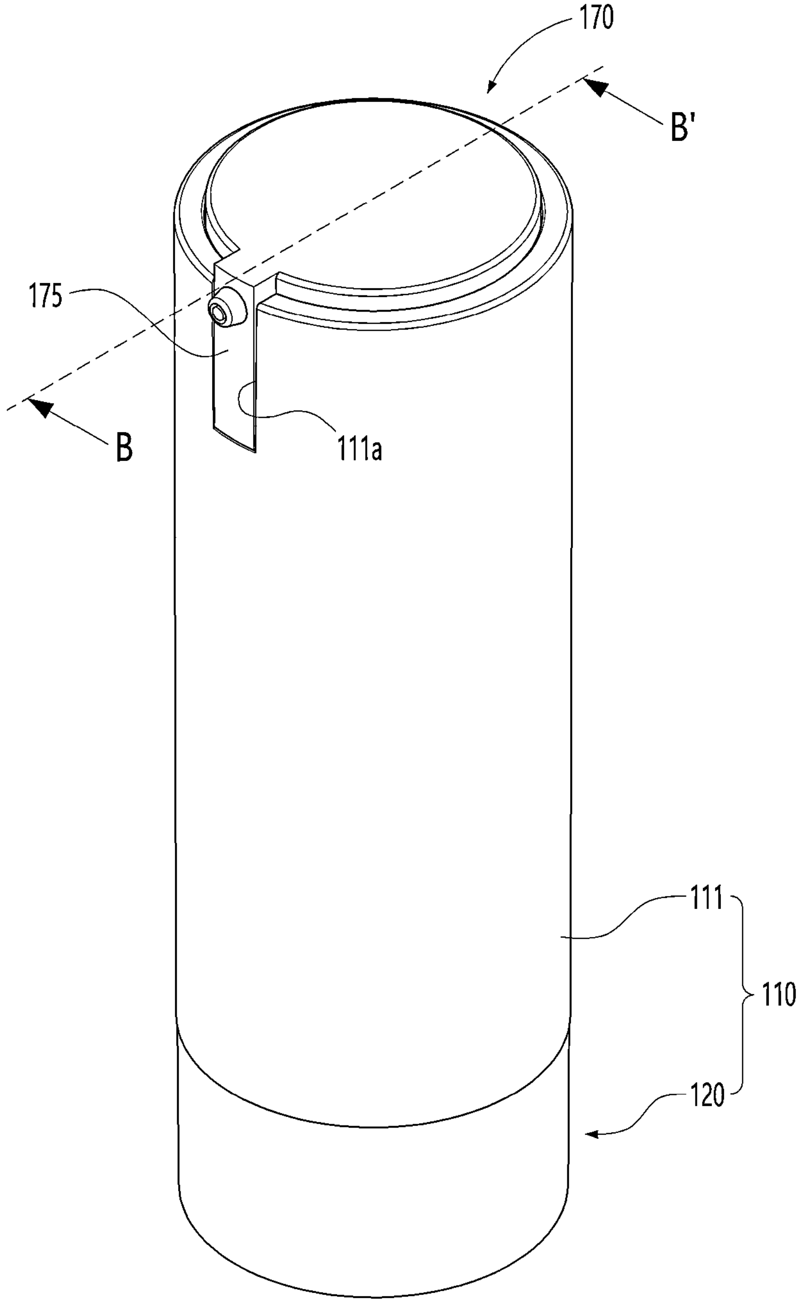
FIG. 16 PRIOR ART
FIG. 16 is an assembled perspective view of a conventional cosmetic container.
Figure 17:
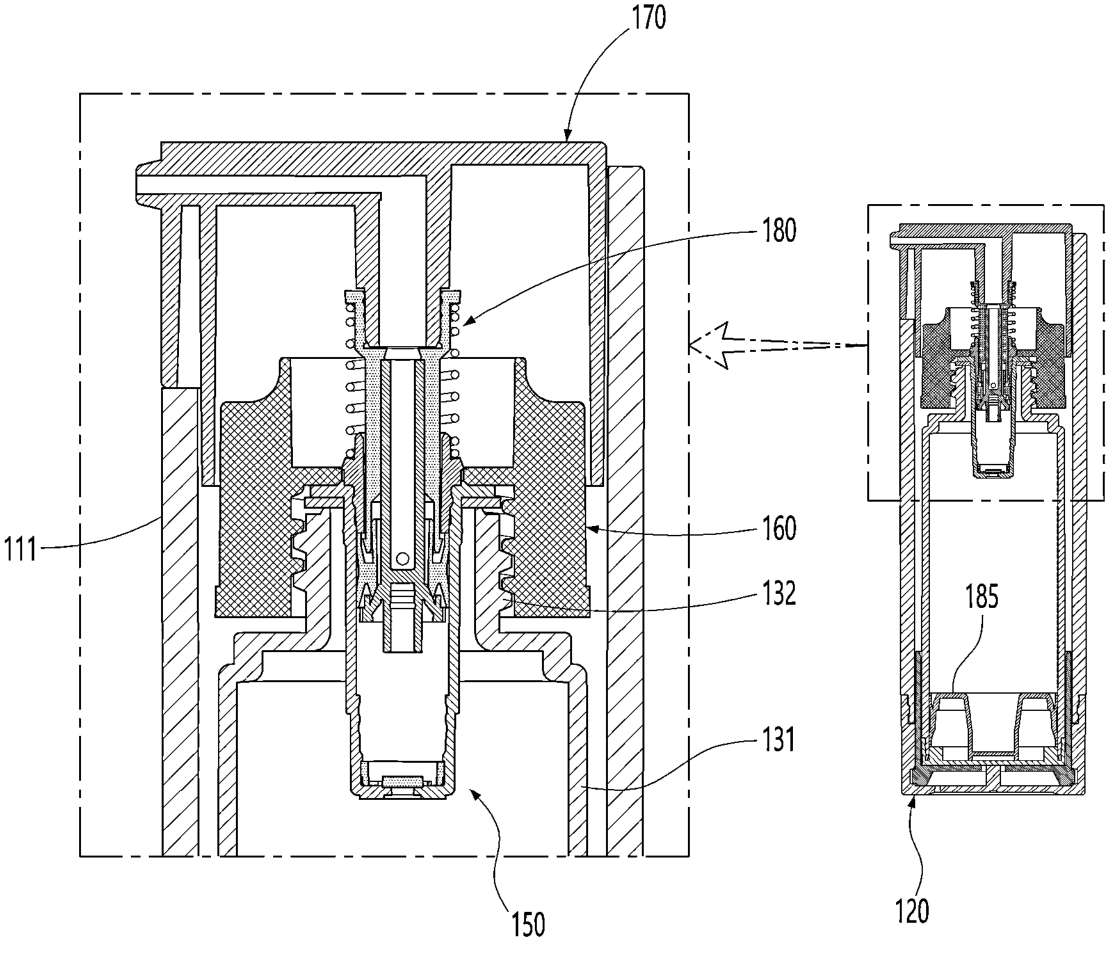
FIG. 17 PRIOR ART
FIG. 17 and FIG. 18 are sectional views taken along line B-B' in FIG. 16, respectively.
Figure 18:
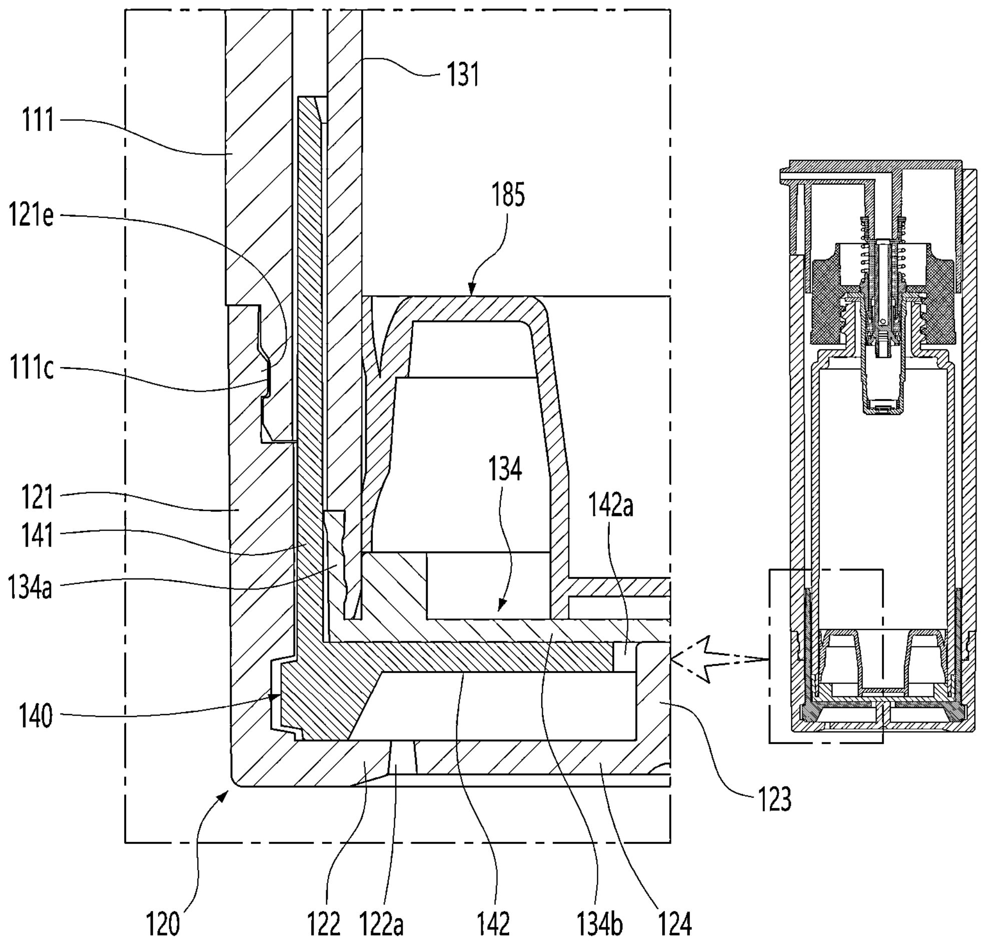
FIG. 18 PRIOR ART
Figure 19:
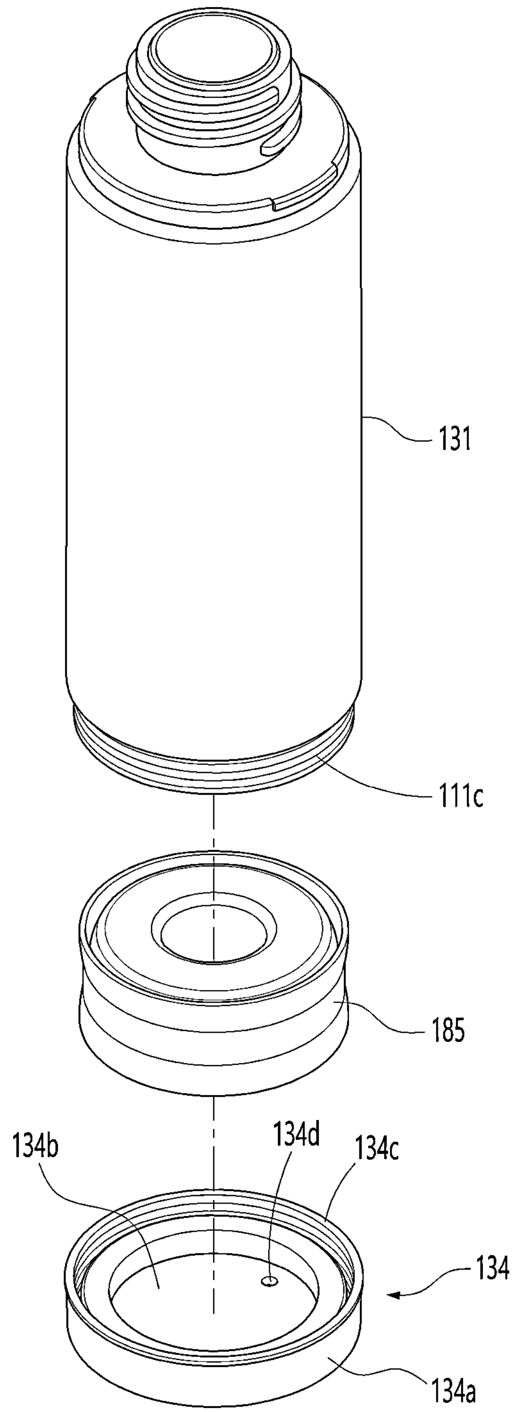
FIG. 19 PRIOR ART
FIG. 19 is an exploded perspective view of an inner container and a container piston of the conventional cosmetic container.
Figure 20:
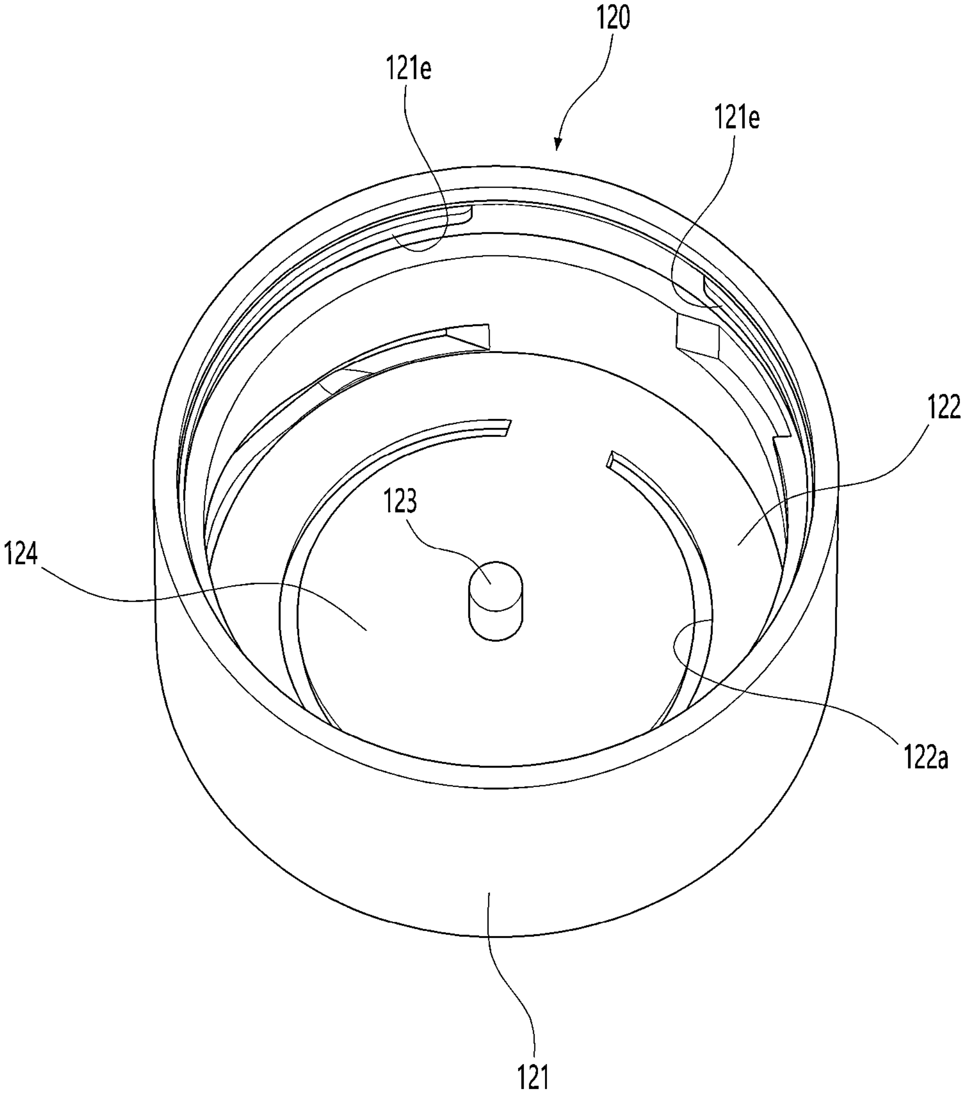
FIG. 20 PRIOR ART
FIG. 20 illustrates an outer container rotatable cap of the conventional cosmetic container.
Figure 21:
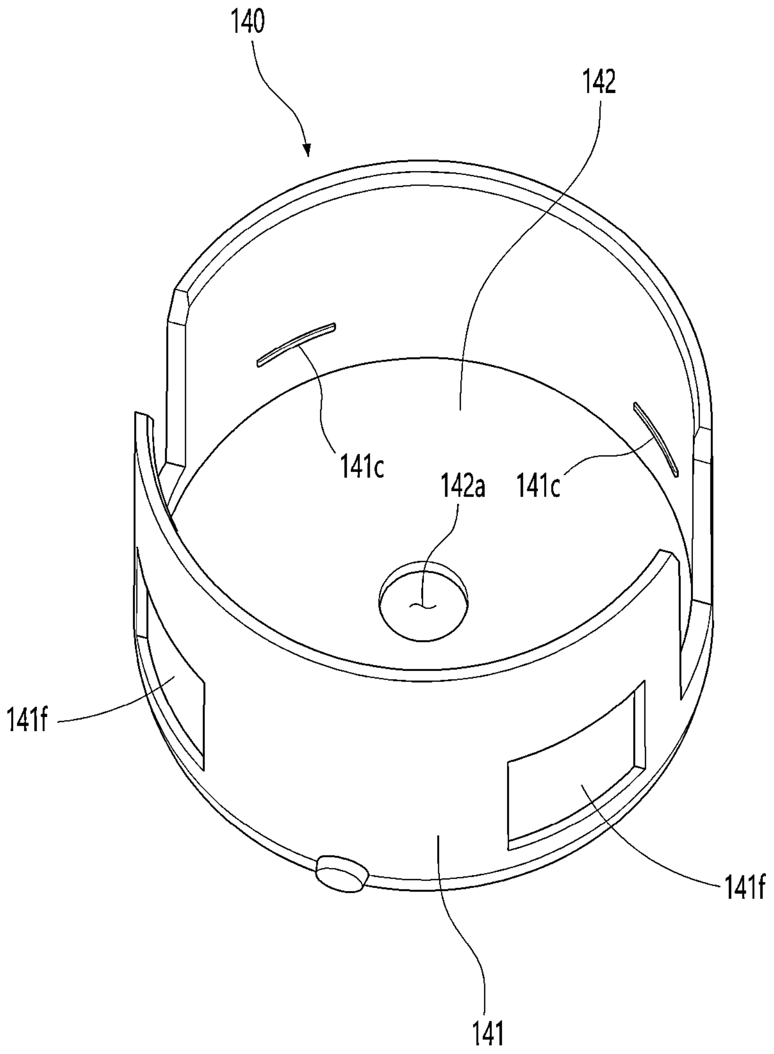
FIG. 21 PRIOR ART
FIG. 21 illustrates an inner container holder of the conventional cosmetic container.
Figure 22:
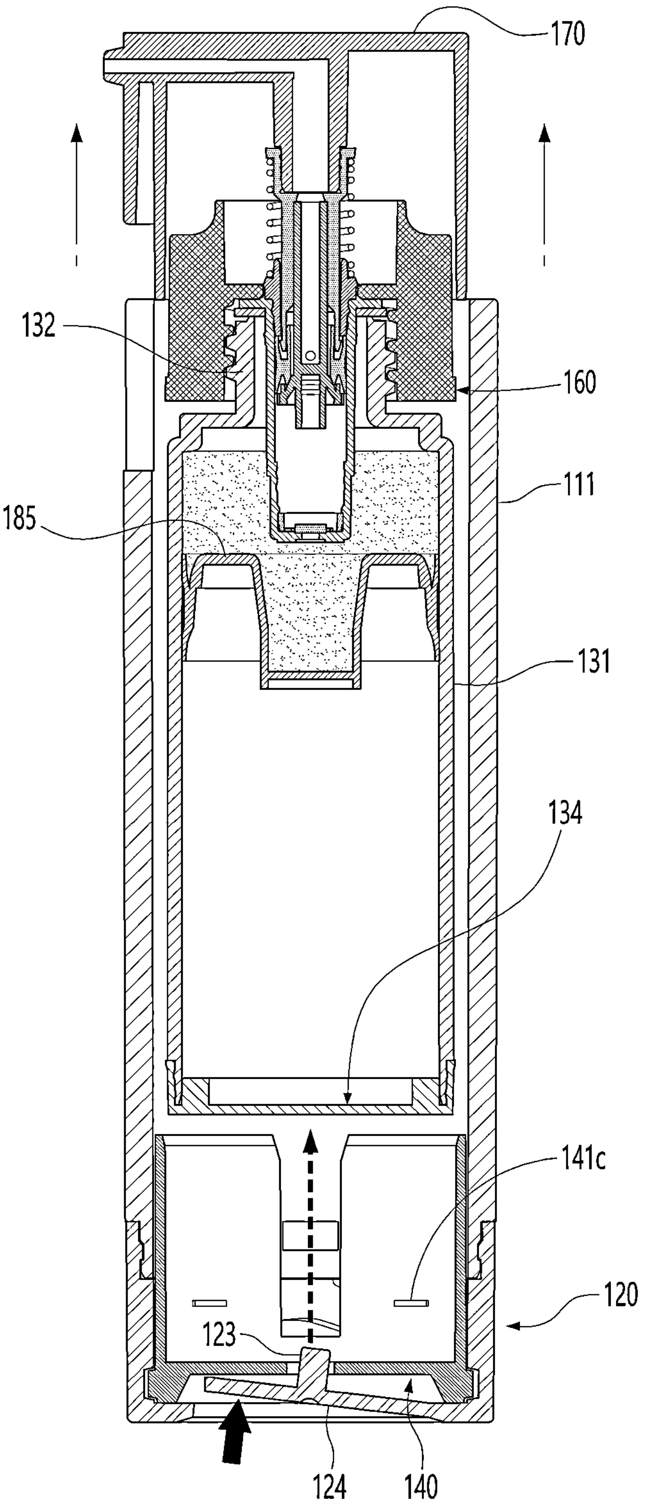
FIG. 22 PRIOR ART
FIG. 22 illustrates a method for using the conventional cosmetic container.

A method for replacing the inner container 30 of the cosmetic container according to an embodiment of the present disclosure will now be described with reference to FIG. 15.

First, the pressurization plate 24 is bent upwards such that the pressurization column 23 pressurizes the end cap bottom portion 34*b*.

The operation of bending the pressurization plate 24 is performed such that the end cap engaging ledge 34*c* moves upwards past the holder engaging protrusions 41*c*.

If the end cap engaging ledge 34*c* moves upwards past the holder engaging protrusions 41*c*, the inner container 30 is separated from the inner container holder 40.

Next, a refill assembly including a new inner container in which a cosmetic product is stored is pressurized toward the holder bottom portion 42.

The operation of pressurizing the refill assembly is performed such that the end cap engaging ledge 34*c* moves downwards past the holder engaging protrusions 41*c*.

If the end cap engaging ledge 34*c* moves downwards past the holder engaging protrusions 41*c*, the new container is coupled to the inner container holder 40.

When the end cap engaging ledge 34*c* moves upwards or downwards past the holder engaging protrusions 41*c*, the holder side portion 41 is deformed.

The holder side portion 41 has left deformation assistance long holes 41*d* and right deformation assistance long holes 41*e* formed therein such that the volume of the holder side portion 41 is reduced in the left and right areas of the holder engaging protrusions 41*c*. Accordingly, when the inner container 30 is replaced, that is, when the inner container 30 is coupled or separated, the end cap engaging ledge 34*c* can be moved upwards or downwards past the holder engaging protrusions 41*c* by applying a smaller amount of force to the pressurization plate 24 or the refill assembly than in the case of a conventional cosmetic container.

In addition, among the entire area of the holder side portion 41, inter-long hole areas 43 are formed thinner than holder side remaining areas such that the volume of the holder side portion 41 is reduced in lower areas of the holder engaging protrusions 41*c*. Accordingly, when the inner container 30 is replaced, the end cap engaging ledge 34*c* can be moved upwards or downwards past the holder engaging protrusions 41*c* by applying an even smaller amount of force to the pressurization plate 24 or the refill assembly than in the case of a conventional cosmetic container.

Meanwhile, although two pairs of holder engaging protrusions 41*c* are provided in the above-described embodiment, the present disclosure may be implemented with a different number of holder engaging protrusions (for example, one pair or three pairs).

What is claimed is:

1. A cosmetic container comprising:

an outer container having a tube-shaped outer container body portion and a concave outer container rotatable cap rotatably coupled to a lower end of the outer container body portion;

a concave inner container holder having a tube-shaped holder side portion and a holder bottom portion extending from a lower end of the holder side portion, the inner container holder being installed in the outer container to be able to move upwards/downwards when the outer container rotatable cap is rotated;

an inner container having a tube-shaped inner container body portion and a concave inner container end cap coupled to a lower end of the inner container body portion, the inner container end cap being disposed in the inner container holder, and the inner container being coupled to the inner container holder to be able to move upwards/downwards together with the inner container holder;

a cylinder having a tube-shaped cylinder side portion and a cylinder bottom portion extending from a lower end of the cylinder side portion and having an inlet hole formed therein, the cylinder being installed in the inner container body portion;

a button having a button discharge channel portion, the button being installed above the cylinder to be able to descend toward the cylinder; and a pumping portion configured to operate such that, when the button descends toward the cylinder, a cosmetic product stored in the cylinder is discharged outwards through the button discharge channel portion and, when the button ascends to an original position, the cosmetic product stored in the inner container is introduced into the cylinder through the inlet hole, wherein the outer container rotatable cap has a tube-shaped rotatable cap side portion, a rotatable cap bottom portion extending from a lower end of the rotatable cap side portion and having a pressurization plate provided at a center thereof, and a pressurization column protruding from the upper surface of the pressurization plate, and the outer container rotatable cap is coupled to the outer container body portion through the rotatable cap side portion;

the holder bottom portion has a column insertion hole formed therein;

the holder side portion has holder engaging protrusions formed on an inner surface thereof so as to face each other, left deformation assistance long holes are formed in straight shapes in left areas of the holder engaging protrusions, respectively, so as to extend from the lower end of the holder side portion to positions higher than the holder engaging protrusions, and right deformation assistance long holes are formed in straight shapes in right areas of the holder engaging protrusions in parallel to the left deformation assistance long holes, respectively, so as to extend from the lower end of the holder side portion to positions higher than the holder engaging protrusions;

the inner container holder is installed such that an end of the pressurization column is inserted into the column insertion hole;

the inner container end cap has a tube-shaped end cap side portion, an end cap bottom portion extending from a lower end of the end cap side portion, and an end cap engaging ledge protruding from an outer surface of the end cap side portion, and the inner container end cap is coupled to a lower end of the inner container body portion such that the end cap engaging ledge protrudes outwards past an outer surface of the inner container body portion; and the inner container is coupled to the inner container holder such that the upper surface of the end cap engaging ledge contacts the bottom surface of the holder engaging protrusions, and when the pressurization plate is bent upwards such that the pressurization column pressurizes the end cap bottom portion, the end cap engaging ledge moves upwards past the holder engaging protrusions, thereby separating the inner container from the inner container holder.

2. The cosmetic container of claim 1, wherein, assuming that areas between the left deformation assistance long holes and the right deformation assistance long holes among the entire area of the holder side portion are inter-long hole areas, and that remaining areas other than the inter-long hole areas are holder side remaining areas, the inter-long hole areas are formed thinner than the holder side remaining areas.

* * * * *